United States Patent

Danielmeyer

[15] 3,675,156

[45] July 4, 1972

[54] LASER PUMP CAVITY WITH CONICAL GEOMETRY

[72] Inventor: Hans Guenter Danielmeyer, Matawan, N.J.

[73] Assignee: Bell Telephone Laboratories, Incorporated, Murray Hill, Berkeley Heights, N.J.

[22] Filed: Feb. 25, 1971

[21] Appl. No.: 118,772

[52] U.S. Cl. .................................................. 331/94.5
[51] Int. Cl. .................................................. H01s 3/09
[58] Field of Search ..................................... 331/94.5

[56] References Cited

UNITED STATES PATENTS

| | | | |
|---|---|---|---|
| 3,355,674 | 11/1967 | Hardy | 331/94.5 |
| 3,483,481 | 12/1969 | Church et al. | 331/94.5 |
| 3,496,484 | 2/1970 | Huffnagle | 331/94.5 |
| 3,230,474 | 1/1966 | Keck et al. | 331/94.5 |
| 3,172,056 | 3/1965 | Stitch | 331/94.5 |
| 3,238,470 | 3/1966 | Mooney | 331/94.5 |

OTHER PUBLICATIONS

Carlough et al., Laser Pumping Cavity. IBM Tech. Discl. Bull. Vol. 6, No. 11 (April 1964) pp 38–39.

*Primary Examiner*—William L. Sikes
*Attorney*—R. J. Guenther and Arthur J. Torsiglieri

[57] ABSTRACT

There is disclosed an optically pumped laser employing a pump cavity including two facing internally reflective conical elements within which an elongated laser element and an elongated pump lamp are respectively axially oriented. Typically, an internally-reflective cylindrical element connects the two conical elements. As compared to prior pump cavities, this cavity provides superior fundamental transverse mode operation and simplified fabrication.

4 Claims, 3 Drawing Figures

Patented July 4, 1972

INVENTOR
H. G. DANIELMEYER
BY Wilford L Wisner
ATTORNEY

LASER PUMP CAVITY WITH CONICAL GEOMETRY

BACKGROUND OF THE INVENTION

This invention provides an improved pump cavity for optically-pumped lasers.

It is well known that an elliptic cylinder geometry is not an ideal geometry for a pump cavity for optically pumped lasers. Lamp and rod cooling jackets cause ray deviations that destroy the circular or radial symmetry of the pump source about its axis and produce consequent radial distortions of the pump intensity about the axis of the laser element. This radial distortion tends to promote oscillation of higher order transverse modes.

Improved configurations employing ellipsoids and spheres avoid these radial distortions, but unfortunately, provide a nonuniform imaging of pump light along the axis of the laser element, so that the laser element is not pumped with the same intensity within each segment of its length.

My object was to devise a pump cavity configuration that would eliminate substantially all of both the foregoing radial and axial pumping distortions.

SUMMARY OF THE INVENTION

According to my invention, a pump cavity for an optically pumped laser includes two facing conical reflectors within which the elongated laser element and the elongated pump lamp are respectively axially oriented. Typically, a cylindrical reflector connects the two conical reflectors.

Advantageously, this configuration provides superior fundamental transverse mode operation and simplified fabrication as compared to the prior art elliptic cylinder, ellipsoidal and spherical geometries.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENT

Figure 1:
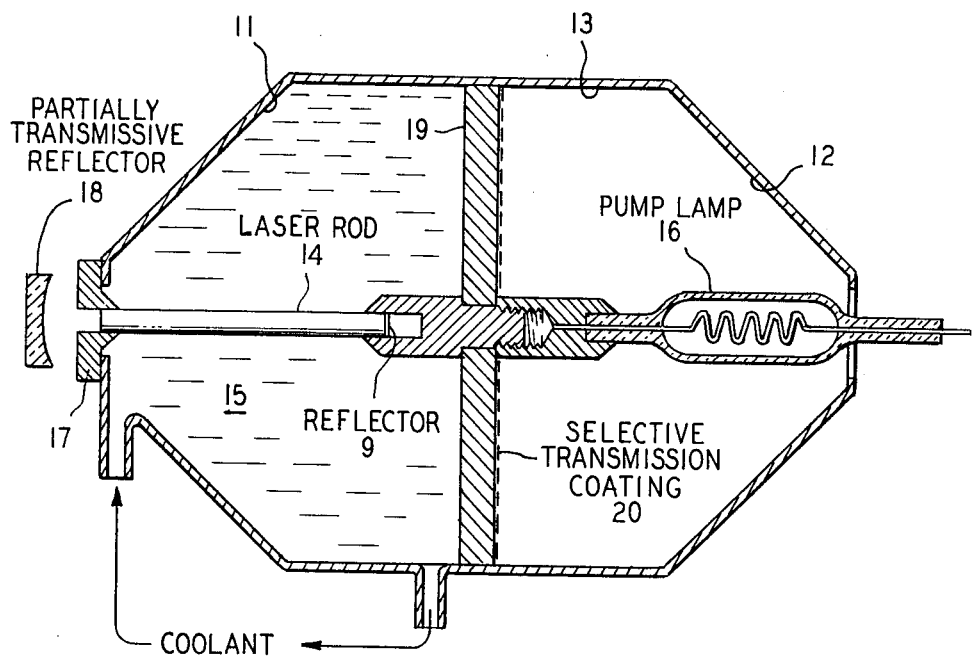
FIG. 1 is a pictorial illustration of a preferred embodiment of my invention.

In FIG. 1, a configuration according to my invention avoids both the radial distortion of pump light distribution found in prior art elliptic cylinder pump light cavities and the axial distortion of pump light distribution found in prior art ellipsoidal and spherical pump light cavities.

The principal elements of the pump light cavity in the configuration of FIG. 1 are the facing conical reflectors 11 and 12, which respectively have the laser element 14 and the pump lamp 16 disposed on their axes. Surrounding the laser element 14 is the cooling chamber 15. It will be noted that, while element 14 and lamp 16 are separated, their long dimensions are aligned along the same line; and the axes of conical reflectors 11 and 12 are aligned along the same line.

Illustratively, the laser element 14 is a laser rod comprising neodymium ions (Nd) in an yttrium aluminum garnet host, although it could also be any optically-pumpable laser element.

Preferably, although not necessarily, the conical reflectors 11 and 12 are joined by the cylindrical, internally-reflective element 13. All reflector surfaces are illustratively gold plated.

Pump lamp 16 is illustratively a 1-kilowatt tungsten lamp that may be optionally, although not necessarily preferably, directly water-cooled.

One end of laser element 14 is illustratively made highly reflective with a reflective coating 9, the other is cut at Brewster's angle or antireflection coated to pass the 1.06 micrometer radiation, and the resonator is completed by reflector 18 disposed beyond a rod mount 17 which contains a suitable seal for the coolant. A 6 mm quartz glass plate 19 separated the laser section from the lamp section. So far, attempts to coat this plate with a coating 20 for transmission only at the main Nd:YAG absorptions has not resulted in lower threshold pump power. However, if proper dielectric coatings can be made, this should result in more economical operation of the laser. For cooling, the laser section was flooded with water entering at the perimeter of the cone tip and leaving at the perimeter of the plate. The parts holding the inner ends of the lamp and the laser rod were made of copper, and gold plated.

To actually test the configuration of FIG. 1 for good radial imaging together with good axial uniformity of the pumping radiation at the laser element, I withdrew the laser rod from the apparatus of FIG. 1, substituted a transparent cooling jacket for the cooling chamber 15, and inserted a probe. This probe was an absorber which consisted essentially of a thin stainless steel tube. The temperature change, not exceeding 1.5° C., of the water flowing through and around the tube was measured with a copper-constantan thermocouple. The flow rate of this separate water supply was stabilized by gravity to 1.60 cubic centimeters per second.

Figure 2:
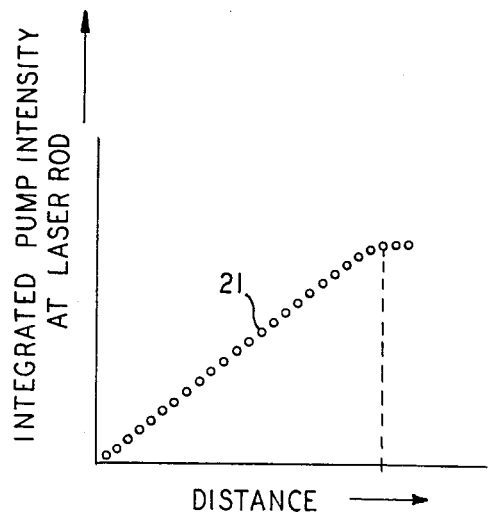
FIG. 2 shows a graph demonstrating the linearity of the integrated pump intensity along the laser element, starting at the left-hand end of the laser element of FIG. 1.

The results for the axial imaging are given in FIG. 2. The small circles of curve 21 show the relative increase of integrated absorbed power as the probe is inserted farther and farther into the position intended for the laser rod from the left-hand extremity of conical reflector 11. In other words, the greater the length of probe exposed to the pumping radiation on the axis of reflector 11, the greater the absorbed light power in a precisely linear relationship, as indicated in FIG. 2. This is a very desirable property for pump cavities to be used with optically pumped lasers, and overcomes the shortcomings of ellipsoidal and spherical cavities in this respect. This linear relationship persisted until the probe was inserted to a position substantially beyond the axial limits of conical reflector 11. As a practical matter, the laser element 14 will be positioned with its right-hand end extending in no farther than the limits of the linear relationship shown by curve 21 of FIG. 2. It may be seen that the region of axial uniformity of linearity, i.e., the pump lamp image, is about 2.3 times longer than the length of the source in the configuration of FIG. 1. This ratio compares to an axial linearity at the laser element of about 1.3 times longer than the source in an elliptic cylinder type of cavity.

Figure 3:
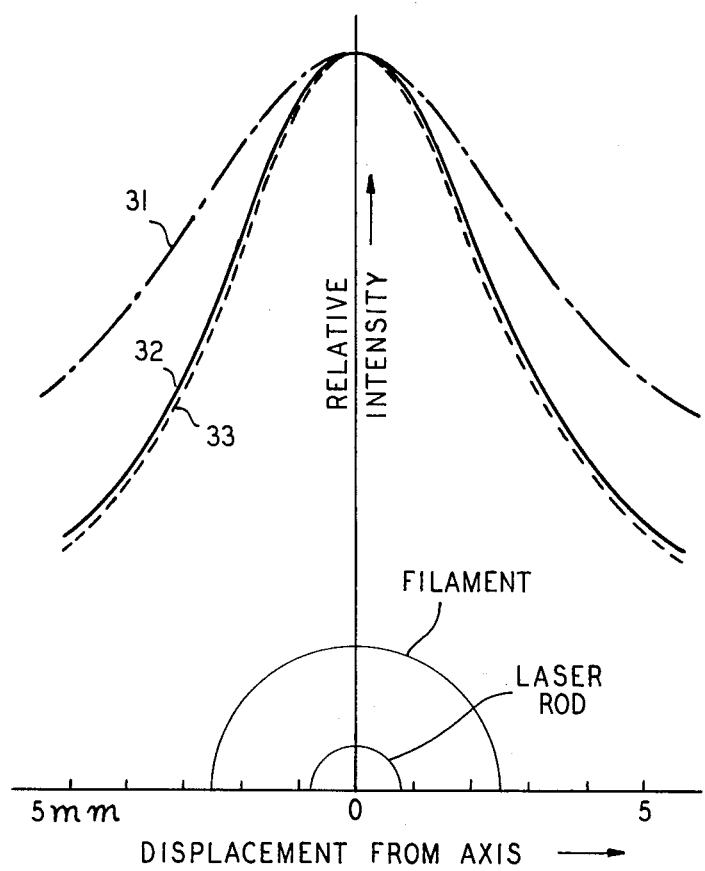
FIG. 3 shows curves comparing the radial focusing properties of the pump cavity of FIG. 1 with the radial focusing properties of an elliptic cylinder pump cavity.

The results for the radial imaging properties of the pump cavity of FIG. 1 are given in FIG. 3 by dashed curve 33. It shows the relative pump intensity, as measured in the embodiment of FIG. 1 by moving the probe radially from the ideal image position. It also shows comparable curves for an elliptic cylinder type of pump cavity, which has nonsymmetrical radial focusing properties. The elliptic cylinder cavity has two different focusing characteristics, one for a radial displacement of the probe in a direction parallel to the short axis of the ellipse in an elliptic cylinder cavity, as shown by curve 31, and one for a radial displacement in a direction parallel to the long axis of the ellipse, as shown by solid curve 32. In contrast, the symmetrical characteristic for the radial focusing properties of the configuration of FIG. 1 for movement of the probe in any radial direction is shown by curve 33. It falls nearly on top of the curve 32. In all cases, the radial distribution of pump light intensity was quite independent of the axis position of the probe.

We see from the curves of FIG. 3 that a cavity with full circular symmetry, such as that of my invention, is definitely superior to the elliptic cylinder cavity because the intensity profile of my pump cavity has in all radial directions a full pumping width of about 7.2 millimeters. In contrast, the elliptic cavity has a much wider intensity profile (12.6 millimeters) for probe displacement parallel to the short axis. The latter fact means that the pump light is less efficiently used by the laser element, when the intensity profile is so wide. Furthermore, the distortion which increases with the ratio of jacket diameter to the length of the ellipse's axes, impairs fundamental transverse mode operation of a laser that uses such a prior art elliptic cylinder cavity.

Another advantage of my pump cavity configuration is that the image diameter equals the source diameter for the pump light in the cavity of FIG. 1.

It is thus seen that the pump cavity configuration of FIG. 1 achieves axial pump light distribution superior to that of ellipsoidal and spherical cavities and achieves radial pump light distribution superior to that of elliptic cylinder pump cavities.

I obtained laser oscillation with the conical cavity using a 3 mm diameter Nd:YAG rod 14 with 28 mm active length. It was HR (high-reflectivity) coated at the surface facing the lamp and AR coated at the other end. I obtained a few milliwatts of output power at 1 kW input power. I lost, however, 40 percent of the pump power because the rod was not long enough (28 mm compared to an image length of 46 mm). Furthermore, the absorption of the cooling water was not negligible. The pump light's path through water was at least 6 cm long. I measured the absorption of a 5 cm water cell for the three major pump bands of Y Nd:YAG weighted with respect to the efficiency of these bands and calculated an average absorption of 14 percent (5 cm). I have also measured that the use of heavy water would eliminate this loss, so that the use of heavy water would have been preferable. By combining the actual losses, it is seen that my laser with the conical pump cavity oscillated with less than half the maximum effective pump power. With the elliptical cavity, I could never get oscillation at half the effective maximum pump power, using the same rod and the same lamp.

This performance, as well as the imaging features above described with reference to FIGS. 2 and 3, leads me to conclude that the conical pump geometry is probably superior to other pump geometries, especially for fundamental transverse mode operation. It is certainly easier to fabricate.

I claim:

1. A device for the stimulated emission of coherent radiation, comprising an elongated active element including a medium capable of said stimulated emission, an elongated lamp for pumping said element, said lamp being separated from and aligned along a common axis with said element, means for stimulating the emission of coherent radiation from said element under conditions of pumping of said element, and a pump radiation cavity including facing conical reflectors respectively disposed about said lamp and said element and aligned on said axis.

2. A device according to claim 1 including a cylindrical reflector connecting said conical reflectors.

3. A device according to claim 2 including means for reflecting that portion of the radiation from said lamp which cannot be used for the pumping of the active medium by a semitransparent plate separating the two conical sections.

4. A device according to claim 1 in which the active element is a dielectric host containing neodymium ions and the conical sections include means for flowing a coolant through at least one of said sections.

* * * * *

Disclaimer 3,675,156.—*Hans Guenter Danielmeyer*, Matawan, N.J. LASER PUMP CAVITY WITH CONICAL GEOMETRY. Patent dated July 4, 1972. Disclaimer filed Oct. 12, 1976, by the assignee, *Bell Telephone Laboratories, Incorporated.*

Hereby enters this disclaimer to all claims of said patent.

[*Official Gazette January 11, 1977.*]